Feb. 18, 1958 E. H. GATZERT 2,824,171

CONNECTOR CIRCUIT FOR USE IN A TELEPHONE SYSTEM

Filed April 25, 1955 5 Sheets-Sheet 1

INVENTOR.
ERNEST H. GATZERT
BY Henry H. Gage
AGENT

Feb. 18, 1958 E. H. GATZERT 2,824,171

CONNECTOR CIRCUIT FOR USE IN A TELEPHONE SYSTEM

Filed April 25, 1955 5 Sheets-Sheet 2

CONNECTOR CIRCUIT FOR USE IN A TELEPHONE SYSTEM

Filed April 25, 1955 5 Sheets-Sheet 3

United States Patent Office 2,824,171

Patented Feb. 18, 1958

2,824,171

CONNECTOR CIRCUIT FOR USE IN A TELEPHONE SYSTEM

Ernest H. Gatzert, Rochester, N. Y., assignor, by mesne assignments, to General Dynamics Corporation, a corporation of Delaware Application April 25, 1955, Serial No. 503,661

10 Claims. (Cl. 179—7.1)

This invention relates to connector circuits in general, and more particularly to connector circuits in which conversation timing facilities are improved.

In a telephone system comprising a connector circuit equipped with conversation timing facilities, it is the practice to provide time measuring means external to the connector circuit; the timing means may be made effective to operate apparatus within the connector circuit by relay means in the connector circuit which are devoted exclusively to this service. Because such relay means are not reused by the connector, the inclusion of the conversation timing feature as used in the past requires as many additional relays for each connector circuit as there are relays in the connecting means.

Accordingly, it is an object of my invention to provide a new and improved connector circuit having conversation timing facilities.

Another object of my invention is to provide a connector circuit arranged for conversation timing in which the busy test relay is reused for connecting common timing apparatus to timing responsive means within the connector.

Another object of my invention is to provide for the reuse of the secondary delay relay to connect a warning tone to a connector equipped with conversation timing facilities.

I accomplish these and other objects by providing a connector comprising a switch suitable for use in a step-by-step system and which may be seized by a calling subscriber line in a manner well understood by those skilled in the telephone art. Means comprising a first relay operated in response to the seizure of the connector causes means responsive to directive signals transmitted from the calling line to be connected to means for advancing the switch in an attempt to establish a connection to a called line accessible from the connector and a station on the called line. Thereafter, means including a second, busy test relay conducts a test to determine whether or not the called line is in busy condition; in the event the line is idle, other means are operated to complete the connection.

Means in the connector operated in response to the transmission of an off-hook signal from the called station to the connector, i. e., answering of a call, is effective for causing timing means to operate means comprising the first relay a first interval of time after the transmission of the off-hook signal to apply a warning tone to the connection; and for thereafter causing other means comprising the busy test relay to open the connection by operating the connector releasing means.

Further objects and advantages of my invention will become apparent as the following description proceeds, and features of novelty which characterize the invention will be pointed out with particularity in the claims annexed to and forming a part of this specification.

For a better understanding of my invention, reference may be had to the following drawings in which.

Figures 1, 6:
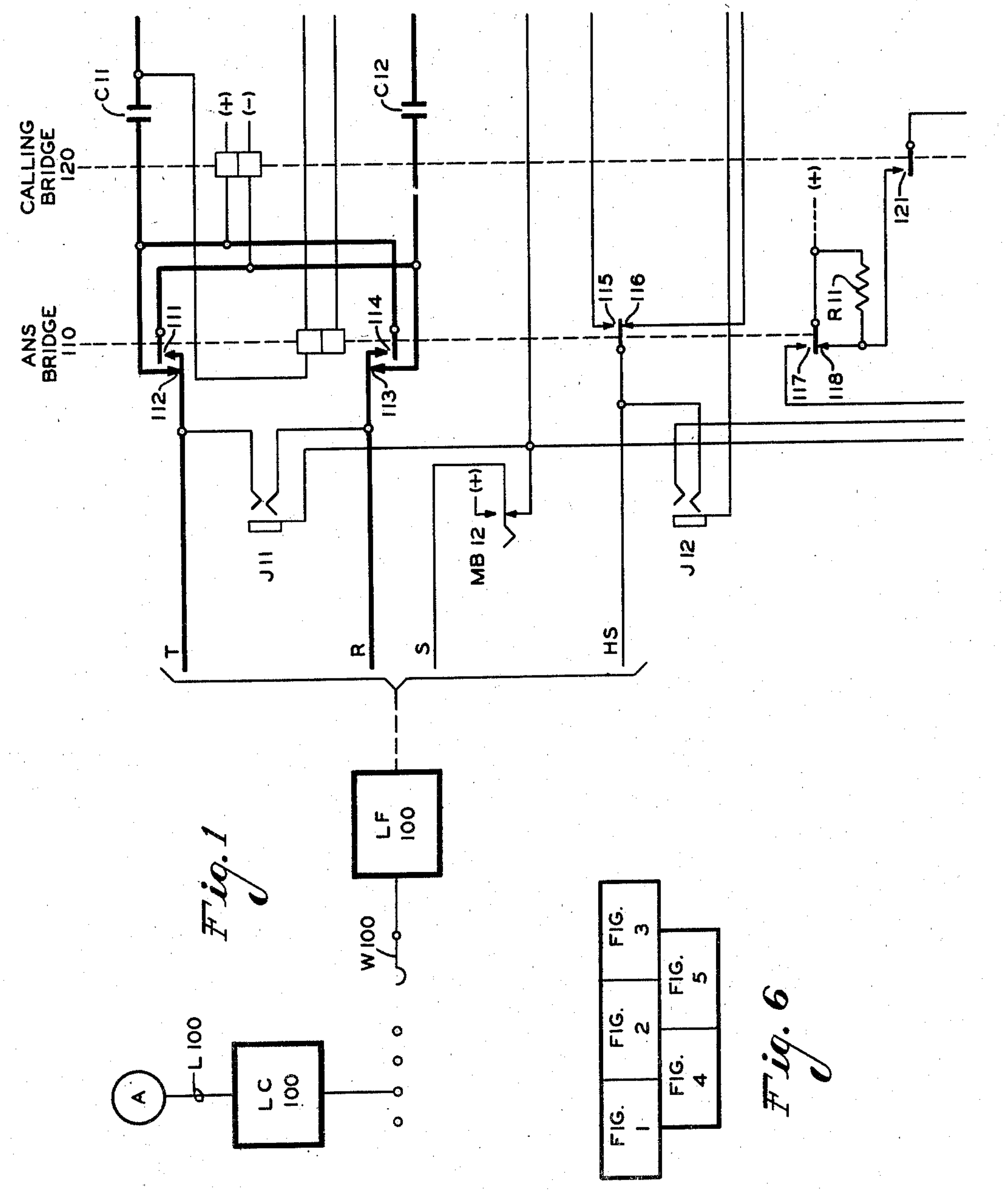
Fig. 1 shows a schematic representation of a subscriber's line and switching equipment suitable for use with the connector switch in which the present invention is incorporated as well as a part of the connector circuit.
Figure 2:
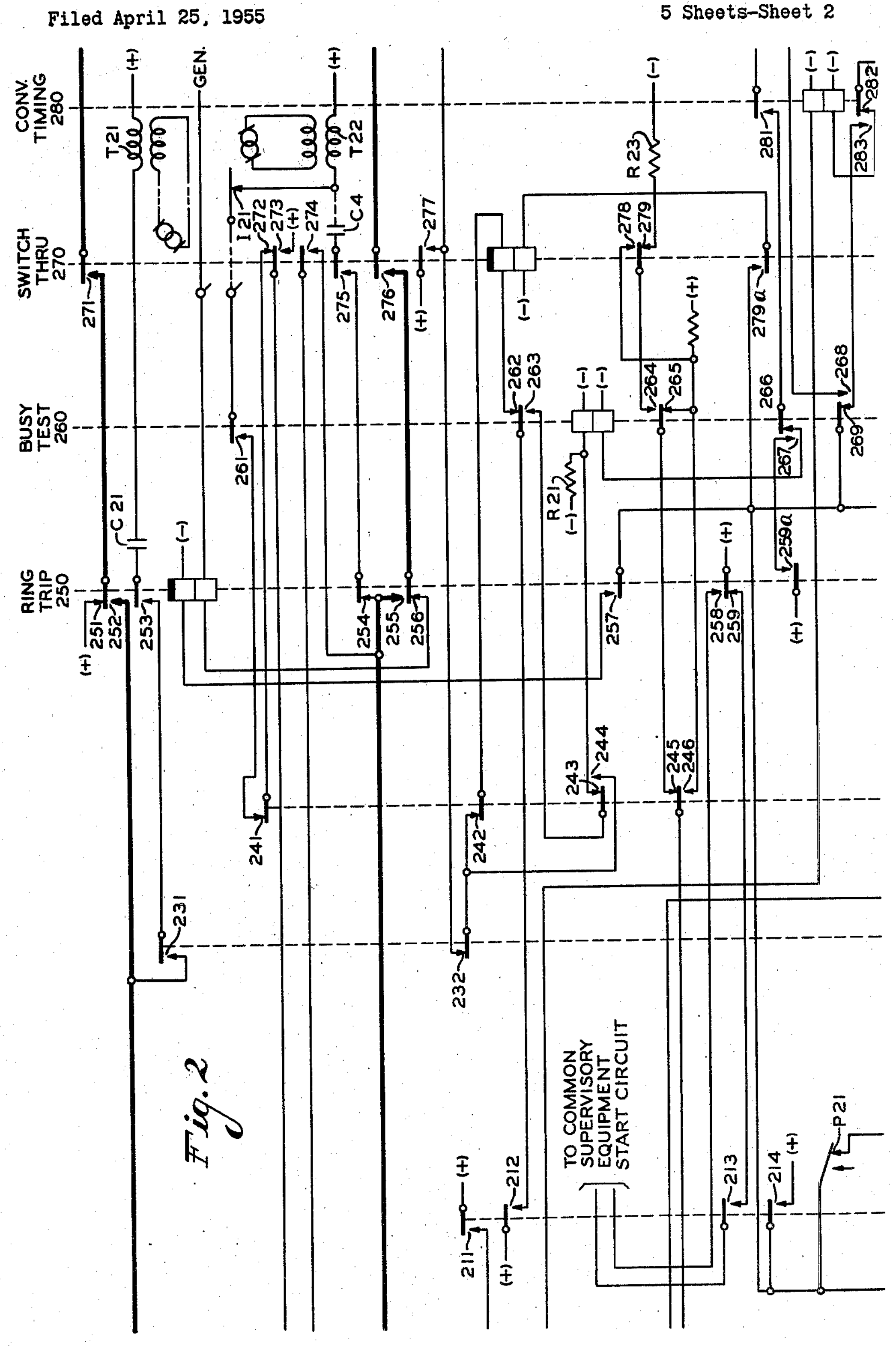
Figs. 2–5 show the remainder of the connector circuit in which the present invention is embodied.
Figure 3:
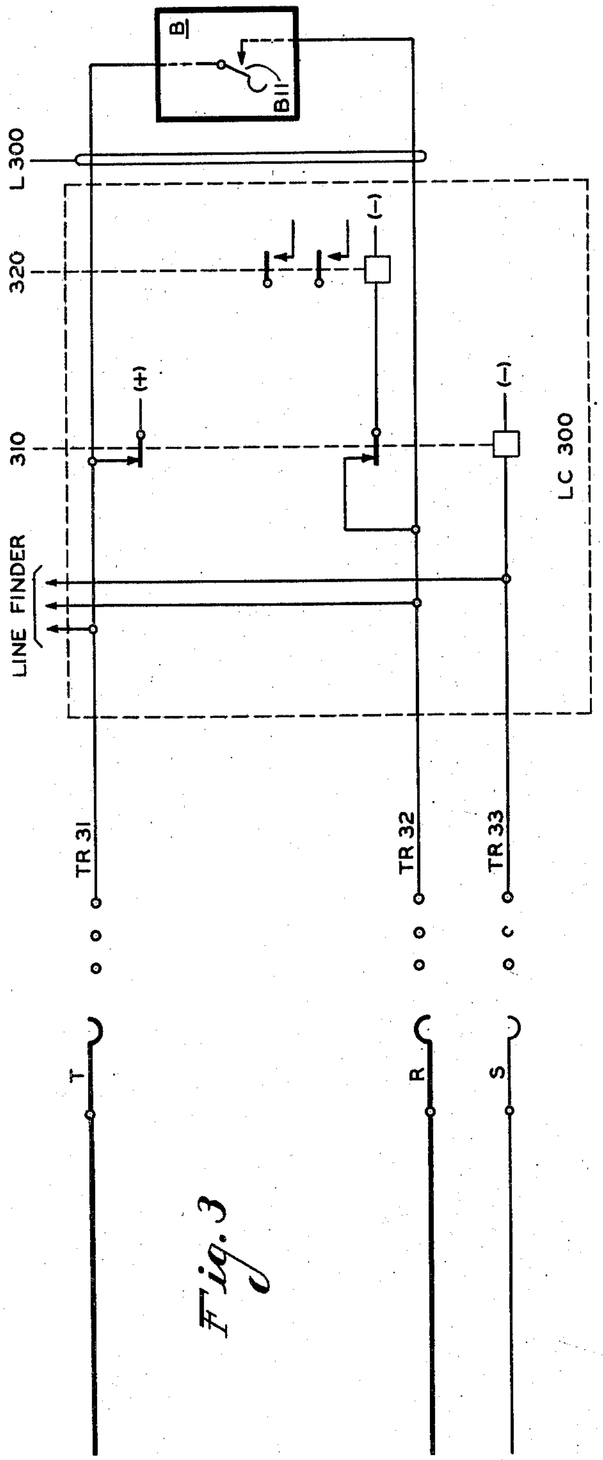
Figure 4:
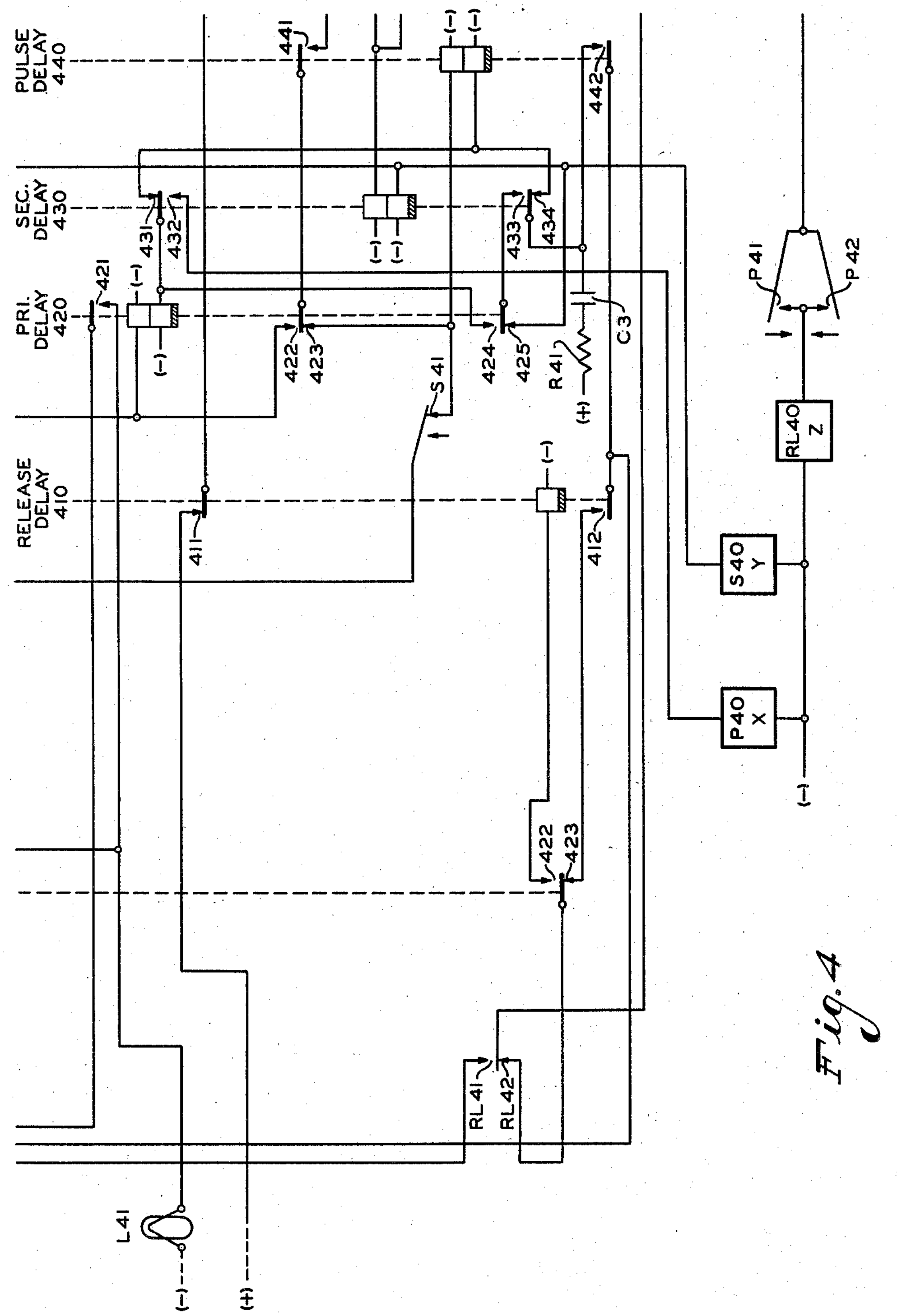
Figure 5:
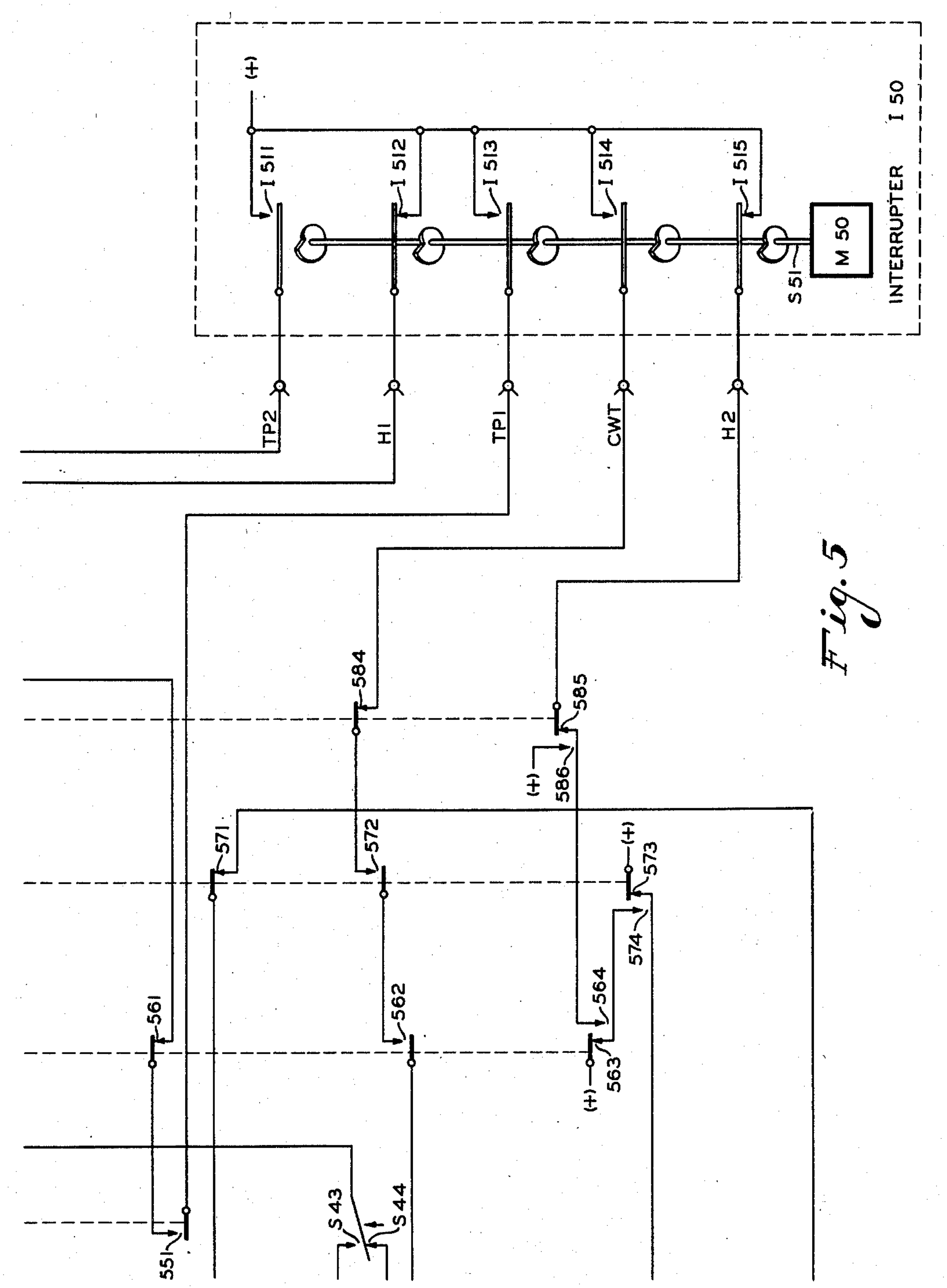

Fig. 3 also shows a line circuit and a subscriber line to which a connection may be extended from the connector; and Fig. 6 shows the relationship between Figs. 1–5, inclusive.

The apparatus referred to in the following description is made to function from power supplied from a source such as a battery. The most positive plate of the battery is connected to ground and is hereafter referred to as "ground" and in the drawings as "(+)"; the most negative ungrounded plate of the battery is referred to as "battery" and in the drawings as "(−)."

Because the present invention resides principally in the connector circuit rather than the switching system outside the connector circuit, and because the switching system is well understood by those skilled in the telephone art, the description of the operation of the latter is presented in general terms.

Referring to Figs. 1 and 3, the system which includes the contemplated connector circuit includes a plurality of subscriber lines, such as L100 and L300 to which stations A and B, respectively, are connected. In order to place a call from a station such as A, the subscriber at station A removes the station telephone from its hookswitch thereby energizing line circuit LC100 on which line L100 is terminated. The energization of line circuit LC100 is effective for energizing line finder LF100 and thus causes wipers, shown compositely as W100, of line finder LF100 to be advanced to engage the terminals to which line L100 is connected. Means within the line finder LF100 are thereafter effective for further extending a connection from station A and line circuit LC100 to the incoming conductors T, R, S and HS of the connector circuit. The latter connection also includes the well known calling loop comprising the talking conductors of line finder LF100 and line L100 as well as apparatus at station A; completion of the calling loop is effective for initiating the seizure of the connector circuit shown in Figs. 1–5 by operating the calling bridge relay 120 in the manner well understood by those skilled in the telephone art.

The operation of relay 120 is effective for operating release delay relay 410 from ground through break contacts 573 on unoperated relay 270, release magnet off-normal springs RL42, make contacts 422 on now operated relay 120, and the winding of relay 410 to battery. Relay 120 is thereafter responsive to trains of directive impulses transmitted from the dial at station A. Such repeated trains of impulses are effective for operating means for advancing the wiper set comprising wipers T, R and S of the connector circuit, a process which is to be explained presently.

To complete the seizure of the connector circuit, primary delay relay 420, secondary delay relay 430 and pulse delay relay 440 are operated in response to the operation of release delay relay 410. Relay 420 is operated over a circuit from ground through now operated make contacts 214 on relay 410, break contacts P21 of the unoperated primary off-normal contacts, the upper winding of relay 420 to battery. Relay 430 is operated over a circuit from ground through now operated make contacts 214 on relay 410, break contacts S44 of the secondary off-normal contacts, and the upper winding of relay 430 to battery. Relay 440 is operated over a circuit from ground through now operated make contacts 214 on now operated relay 410, break contacts S41 of the unoperated secondary off-normal contacts, and the upper winding of relay 440 to battery.

With relays 420, 430 and 440 operated, the connector circuit is in condition to receive first, second and third trains of directive impulses caused by a first, second and third operation of the dial at station A. Each impulse is created in the well known manner by opening the loop of line A at the contacts of the calling station dial which are included in series with the previously referred to operating loop of relay 120.

Each impulse in the previously mentioned trains of impulses received at the connector circuit is effective for releasing calling bridge relay 120; at the conclusion of each impulse the operating circuit of relay 120 is re-established to cause relay 120 to reoperate in the well known manner. Thus relay 120 is effective to repeat each of the trains of impulses and functions at break contacts 423 as a pulse source. Relay 410 is a slow to release type and is held in operated condition throughout the repetition of a train of impulses by relay 120 even through the operating circuit of relay 410 is intermittently opened at make contacts 422.

The advance of the wipers T, R and S in the primary direction is next described. Means comprising contacts 424 on primary delay relay 420 are effective for connecting the impulsing source comprising contacts 423 on calling bridge relay 120 to the primary moving means comprising magnet P40. Thus each time relay 120 is released, a circuit is completed from ground through break contacts 573 on unoperated relay 270, break contacts RL42 on the unoperated release magnet off-normal springs, break contacts 423 on now released relay 120 and make contacts 412, 442, 433, 424 and 432 on now operated relays 410, 440, 430, 420 and 430, respectively, and the winding of primary magnet P40 to battery. From make contacts 424, an obvious connection is also completed to the lower winding of primary delay relay 420 so that the intermittent pulses transmitted to the magnet P40 are also effective for energizing the relay 420 and thereby maintain the relay 420 in its operated condition throughout the transmission of a train of impulses to magnet P40.

The advance of the wiper set in its primary direction away from its normal position is effective for operating the primary off-normal springs thereby opening the previously described energizing circuit for the upper winding of primary delay relay 420 at now operated break contacts P21. Thus each impulse transmitted to primary magnet P40 is effective for causing wipers T, R and S to advance one step in the primary direction away from the normal position of the wiper set. At the conclusion of the transmission of a train of impulses, relay 120 comes to rest in its operated condition so that the above-described energizing circuit for primary magnet P40 as well as the holding circuit for energizing the lower winding of primary delay relay 420 are opened at now operated break contacts 123 for a period of time long enough to allow slow release relay 420 to be restored to its normal condition.

The advance of the wiper set in the primary direction is effective to cause the connector to select one of the levels of contact sets which are disposed for engagement by the set of wipers T, R and S. The wiper set may thereafter be moved within the selected level in a secondary direction to select one of the sets of contacts within the level.

The release of primary delay relay 420 is effective for disconnecting the previously described impulsing means from its connection to the primary magnet P40 and the holding circuit of relay 420 at make contacts 424 and break contacts 425, respectively. The operation of secondary delay relay 430 is thereupon effective for connecting the secondary magnet S40 to the pulse source at make contacts 433, so that the pulsing of relay 120 in response to a second train of impulses is effective to cause the secondary means comprising magnet S40 to be operated and thereby advance the wiper set within the previously selected level.

Upon each release of relay 120 during the transmission of the second impulse train, a circuit is completed from the impulsing source comprising break contacts 423, make contacts 412, 442 and 433 on now operated relays 410, 440 and 430, respectively, break contacts 425 on now released relay 420, the winding of magnet S40 to battery. A second circuit is also completed from the pulsing source from break contacts 425 through the lower winding of relay 430 to battery. Relay 430, a slow release type, is thereby maintained in its operated condition throughout the time that energizing impulses are being transmitted to magnet S40. Each energization of magnet S40 is effective for advancing the wiper set T, R and S one step in the secondary direction of the levels of contacts which has been selected by the primary movement of the wipers.

The movement of the wiper set away from its normal secondary position is effective for operating the secondary off-normal contacts. Operation of secondary off-normal contacts S44 is effective for opening the previously described energizing circuit for the upper winding of secondary delay relay 430 at break contacts S44; relay 430 therefore releases when the previously described holding circuit is opened at the conclusion of transmission of the second train of impulses. The operation of the secondary off-normal contacts is also effective for establishing an alternate energizing circuit for relay 440 at now closed make contacts S43. The latter circuit is traced from ground through make contacts 214 on now operated relay 410, make contacts S43 of the operated secondary off-normal contacts, make contacts 441 on now operated relay 440, break contacts 423 on unoperated relay 420, and the upper winding of relay 440 to battery. The establishment of the alternate energizing circuit for relay 440 is effective for replacing the previously described operating circuit for relay 440 which is opened by the operation of break contacts S41 of the secondary off-normal contacts.

Assume that the previously described primary and secondary movements of the wiper set have been effective to advance the wiper set to terminals TR31–TR33, shown in Fig. 3, and on which the conductors of line L300 are terminated. A connection is thus established between the wipers T, R and S and terminals T31, T32 and T33, respectively.

The transmission of the third and last train of impulses from station A is effective to operate relay 120 in the previously described manner to operate the pulse source comprising break contacts 423. It is pointed out that the previous release of secondary delay relay 430 is effective for transferring the pulse source from its previously described connection to magnet S40 to a connection to the lower holding winding of relay 440 at make contacts 433 and break contacts 434, respectively. Thus, the final transmission of ground pulses from break contacts 423 is effective for energizing the lower winding of relay 440. A connection is also extended from the lower winding of relay 440 to the lower winding of primary delay relay 420 responsive to the release of secondary delay relay 430 at break contacts 431, so that the repetition of the final train of impulses by contacts 423 is effective for reoperating primary delay relay 420 through its lower winding. The operation of relay 420 is effective for opening the previously described alternate operating circuit for the upper winding of relay 440 at break contacts 423 and for establishing a temporary holding winding for relay 420 as follows: from ground through make contacts 214 on operated relay 410, make contacts S43 of the operated secondary off-normal contacts, make contacts 441 of now operated relay 440, make contacts 422 of now operated relay 420, and the upper winding of relay 420 to battery.

At the conclusion of the pulsing operation of break contacts 423 the pulsing source is opened thereby de-energizing the lower winding of relay 440, which thereupon releases. The release of relay 440 is effective for opening the previously described second operating circuit for the upper winding of relay 420 at now opened make contacts 441. Relay 420 thereupon releases and remains released throughout the remainder of the call. The release of relay 440 is effective for opening the previously described impulsing circuit at make contacts 442 so that further impulsing of relay 420 is without influence over the impulse responsive apparatus within the connector circuit.

Returning to the point in the description at which the second train of impulses has been repeated by relay 120 and relay 430 has released but before the transmission of the third train of impulses, relay 440 is still in operated condition and the wipers T, R and S have been advanced to the terminals TR31–TR33 so that wiper S is in contact with the corresponding terminal TR33.

The connector conducts a test at this point to determine whether or not the called line is in busy condition in the next described manner. A busy condition on the called line is indicated by the presence of ground connected to the conductor which in turn is connected to the terminal corresponding to TR33. With the wiper S engaging terminal TR33, the presence of ground on TR33 is effective for operating busy test relay 260 over the following circuit: from TR33 through wiper S, break contacts 232 on now released relay 430, make contacts 244 on still operated relay 440, and the upper winding of busy test relay 260 to battery. The subsequent transmission of the third final train of impulses to the connector is effective to release relay 440 in the previously described manner. The release of relay 440 is effective to establish a locking circuit for relay 260 as follows: from ground through make contacts 212 and 263 on operated relays 410 and 260, respectively, break contacts 243 on released relay 440, and the upper winding of relay 260 to battery. In response to the operation of busy test relay 260 and the release of relay 440, which takes place at the conclusion of the transmission of the third impulse train in the previously described manner, means comprising make contacts 261 controlled by relay 260 are thereafter effective for completing a connection between a low impedance tone source such as the winding of transformer T22 through the interrupter contacts I21, break contacts 241 on now released relay 440, break contacts 272 on unoperated relay 270, the upper winding of answering bridge relay 110, to the talking conductors of the connector circuit and thence through the calling subscriber's station A by way of coupling capacitor C11. The return path includes the lower winding of calling bridge relay 120 through the battery to ground. The presence of the interrupted busy tone is effective to inform the calling subscriber at station A that the line to which a connection is sought is in busy condition.

In the event that the line circuit LC300 tested idle, i. e., no ground is present on the conductor connected to terminal TR33, busy test relay 260 fails to operate over the previously described circuit at the end of the transmission of the second train of impulses. After the third impulse train has been transmitted as described above, the release of relay 440 in the previously described manner at the conclusion of the transmission of the impulse train is effective for completing an operating circuit for switchthrough relay 270. The circuit is traced as follows: from ground through now operated make contacts 212 on operated relay 410, break contacts 262 on now released relay 260, the upper winding of switchthrough relay 270, break contacts 242 and 232 on now released relays 440 and 430, respectively, the wiper S, the conductor connected to terminal TR33, and the winding of cutoff relay 310 of called line circuit LC300 to battery. Relay 270 thereupon operates sufficiently to establish an operation-completing circuit for itself from ground through make contacts 214 on now operated relay 410, preliminary make contacts 279*a* on relay 270, and the lower winding of relay 270 to battery, so that relay 270 is thereupon completely operated.

The operation of relay 270 thereupon completes at make contacts 271 and 276 a well known energizing circuit for the alternating current operated signal device at the called station B on line L300. The alternating circuit may be traced from the generator source connected to lead GEN, the lower winding of ring trip relay 250, break contacts 256 on now unoperated relay 250, make contacts 276 on operated relay 270, wiper R, the lower conductor of line L300, a well known signaling device (not shown) at station B, the upper conductor of line L300, wiper T, now operated make contacts 271 on relay 270, break contacts 251 on ring trip relay 250 to ground. The operation of relay 270 is also effective to transfer the ground supply for the previously described operating circuit of release delay relay 410 from break contacts 585 to ground supplied from break contacts 563 on unoperated busy test relay 260 through now operated make contacts 574.

When the subscriber at called station B on line L300 responds to the alternating current signal, as by lifting the handset after hearing the ringing signal, an off-hook signal is caused by the completion of a direct current circuit through the called line loop. The ring trip relay 250, the lower winding of which is in series with the called line loop, operates in response to the off-hook signal in a manner well understood by those skilled in the telephone art. The operation of relay 250 completes a locking circuit for itself from ground supplied through make contacts 214 on now operated relay 410, make contacts 257 on relay 250, and the upper winding of relay 250 to battery. The operation of relay 250 is effective to complete at make contacts 252 and 255 a connection between the calling and called subscriber's line L100 and L300 respectively. The operation of ring trip relay 250 is also effective for disconnecting the previously referred to alternating current ringing source from the called subscriber's line at contacts 251 and 256. The conversation between calling station A and called station B may thereupon proceed.

In order to prevent the above described connection from station A to station B from being held indefinitely, timing means common to a group of connector circuits, such as the one being described here, are effective for opening the connection by releasing the connector circuit a predetermined interval of time after the connection has been established. This timing process is next described.

An interrupter common to a number of connectors, such as the one described here, includes a motor M50 which is effective for driving a shaft, such as S51, on which various cams are mounted. These cams in turn drive interrupter contacts, such as I511, and thereby cause the contacts to put out various periodic pulses and holding signals over the output leads. The intervals of the pulses and signals is dependent upon the speed of rotation of shaft S51 and upon the shape of the cam associated with the interrupter contacts individual to the output leads. Such interrupters are well understood by those skilled in the telephone art and need not be described in further detail here.

Returning to the description of the connector, the operation of the called station signal responsive means comprising relay 250 is effective for connecting the lower winding of conversation timing relay 280 to conductor TP1 at make contacts 551 on now operated relay 250 and break contacts 561 on released relay 260. When the interrupter I50 causes a ground impulse to be transmitted over conductor TP1 from contacts I513, relay 280 operates. The operation of relay 280 transfers its lower winding from the operating circuit at contacts 282 to a locking connection extending from make contacts 283, break contacts 269 on now released relay 260 and make contacts 214 on now operated relay 410 to ground.

The operation of relay 280 is effective to connect the lower winding of busy test relay 260 to the TP2 conductor from interrupter I50 through the following circuit: from battery through the lower winding of relay 260, break contacts 266 on unoperated relay 260, make contacts 281 on now operated relay 280 to conductor TP2. Interrupter I50 is effective for causing contacts I511 to be closed a predetermined interval of time after the transmission of the ground signal over conductor TP1. The transmission of the ground signal over conductor TP2 is effective to operate relay 260. Relay 260 thereupon locks in operated condition from ground supplied through make contacts 259*a* on operated relay 250 and 267 on relay 260.

The operation of relay 260 is effective for transferring the ground supplied for the previously described operating circuit of release delay relay 410 from break contacts 563 to a ground supplied through make contacts 586 on now operated relay 280 to make contacts 564, thence to make contacts 574 on switchthrough relay and over the remainder of the previously described operating circuit for release delay relay 410. The operation of relay 260 is also effective to transfer the holding circuit for relay 280 from its connection to ground supplied from make contacts 214 on relay 410 to ground supplied over conductor H1 from the interrupter I50 at break contacts 269 and make contacts 268, respectively. At the time that relay 260 is operated over conductor TP2, the condition of interrupter I50 is such that ground is being transmitted over conductor H2 through break contacts I515; therefore, relay 280 continues to be held in its operated condition in response to the operation of relay 260.

As shaft S51 of interrupter I50 is further revolved, the cam associated with break contact I512 causes the latter to open thereby sending forward an absence of ground signal over conductor H1. The absence of ground is effective for opening the above described holding circuit for relay 280, which thereupon releases. In response to the above described release of relay 280, the operation of relay 260 is effective to connect the upper winding of the secondary delay relay 430 to the CWT conductor from interrupter I50 over the following circuit: the conductor CWT through break contacts 584 on now released conversation timing relay 280, make contacts 572 on now operated relay 270, make contacts 562 on now operated busy test relay 260, and the upper winding of relay 430 to battery.

The arrangement of the cams on shaft S51 is such that at the end of a predetermined time interval following the operation of relay 280 which is caused by the closing of interrupter contacts I513, contacts I514 are closed to transmit a ground impulse over conductor CWT. Relay 430 thereupon operates over the above traced circuit at the end of a first predetermined time interval after the operation of relay 250.

The operation of the secondary magnet connecting means comprising relay 430 and the off-hook signal responsive means comprising relay 250 are jointly effective for connecting a source of warning tone from a low impedance transformer such as T21 through blocking capacitor C21, make contacts 253 and 231 on relays 250 and 430, respectively, through the loops of the calling and called lines, and the lower windings of the bridge relays 110 and 120 through the battery to ground. The conversation warning tone informs the subscribers that the connection is about to be opened.

Returning to conversation timing relay 280, the release of relay 280 and the operation of busy test relay 260 are also effective for opening the previously described ground supply for the operating circuit for release delay 410 at contacts 586 and for substituting ground supplied over conductor H2 from the interrupter I50. The arrangement of the cams on interrupter 150 is such that contacts I515 open a predetermined interval of time following the above described closing of contacts I513; the opening of contacts I515 removes the ground connection from conductor H2. The absence of ground signal transmitted over conductor H2 is effective to release release delay relay 410 a second predetermined time interval after the operation of relay 250.

The release of release delay relay 410 is effective to bring about the opening of the talking connection between the calling and called subscribers at stations A and B by causing the wiper set T, R and S to be restored from their advanced position to terminals TR31–TR33 to their normal position in the manner next described. The release of relay 410 is effective to release ring trip relay 250 and switchthrough relay 270 by opening the previously described locking circuits of the latter relays at contacts 214. The release of relays 410 and 270 is effective for completing a connection for energizing release magnet RL40 over the following circuit: from battery through the winding of magnet RL40, through now operated off-normal contacts P41 and S42, in parallel, break contacts 571 and 411 on now released relays 270 and 410, respectively, to ground. Magnet RL40 thereupon operates to release the wipers from their advanced position to their normal position in the well known manner.

The release of relay 410 is also effective for opening the ground connection to the back sleeve conductor S at make contacts 211; removal of the ground from conductor S is effective to bring about the release of the preceding switch equipment such as line finder LF100. In response to the release of line finder LF100 the calling bridge relay 120 is released. The release of ring trip relay 250 is effective for opening the previously described locking circuit for busy test relay at make contacts 259*a*. With the release of the wiper set to its normal position and release of relays 120, 410, 250, 260 and 270 the connector is restored to its normal condition. It is now ready for reuse on another call.

While I have shown and described a specific embodiment of my invention, other modifications will readily occur to those skilled in the art. I do not, therefore, desire my invention to be limited to the specific arrangement shown and described, and I intend in the appended claims to cover all modifications within the scope and spirit of my invention.

What is claimed is:

1. In a telephone system, a connector for extending a connection to a called line and a station on said called line, a relay, means comprising said relay for detecting a busy condition on said called line to prevent the completion of said connection, means operative in the event said called line is in idle condition for completing said connection, means for opening said connection within said connector, means comprising said relay for preparing said opening means for operation, and means operative in response to the transmission of an off-hook signal from said called line station to said connector for operating said relay to render said preparing means operative.

2. In a telephone system, a connector for extending a connection to a called line and a station on said called line, a relay, means comprising said relay for detecting a busy condition on said called line, means operative in the event said called line is in idle condition for completing said connection, means for opening said connection within said connector, means comprising said relay for preparing said opening means for operation, timing means, and supervisory means operative in response to the transmission of an off-hook signal from said called line station to said connector for causing said timing means to make said preparing means including said relay operative and to thereafter operate said opening means a predetermined interval of time after the transmission of said off-hook signal.

3. In a telephone system, a connector for extending a connection to a called line and a station on said called line, a relay, a tone source, means comprising said relay operative in response to a busy condition on said called line for connecting said one source to said connector, timing means for periodically generating signals, means operative in response to the transmission of an off-hook signal from said station to said connector for causing said relay to operate in response to a signal transmitted from said timing means, means for opening said connection within said connector, and means comprising said relay in operated condition for causing said opening means to operate upon the transmission of another signal from said timing means whereby said connection is opened a predetermined time interval after the operation of said signal responsive means.

4. In a telephone system, a connector for extending a connection to a called line and a station on said line, a relay comprising sets of contacts, means comprising said relay for detecting a busy condition on said called line, means comprising one of said contact sets operative in response to the operation of said relay for connecting a tone source to said connector in the event said called line is in busy condition, means operative in the event said called line is in idle condition for completing said connection, timing means for periodically generating signals, means operative in response to the transmission of an off-hook signal from said station to said connector for causing said relay to operate in response to the transmission of a signal from said timing means, means for releasing said connector to open said connection, and means comprising another of said contact sets operative in response to the operation of said relay for connecting another signal from said timing means to said releasing means, in order to operate said releasing means a predetermined time interval after the operation of said off-hook signal responsive means.

5. In a telephone system, a connector comprising a switch for extending a connection from a calling line to a called line and a station on said called line, means comprising said calling line for seizing said connector, a relay, means operative in response to the seizure of said connector for operating said relay, means for operating said switch, means under the control of said calling line for energizing said operating means, means comprising said relay for connecting said energizing means to said operating means, means operative after the operation of said connector operating means for rendering said energizing connecting means inoperative, means comprising said relay for transmitting a signal to said connection, and means operative in response to the transmission of an off-hook signal from said called line station to said connector for operating said relay to render said signal transmitting means operative.

6. In a telephone system, a connector for extending a connection from a calling line to a called line and a station on said called line, means comprising said calling line for seizing said connector, a relay, means operative in response to the seizure of said connector for operating said relay, means comprising a magnet for operating said connector, a pulse source under the control of said calling line for operating said magnet, means comprising said relay for connecting said pulse source to said magnet, means operative after the operation of said magnet for disabling said pulse source connecting means, means comprising said relay for transmitting a signal to said connection, timing means for generating periodic signals, and supervisory means operative in response to the transmission of an off-hook signal from said called line station to said connector for making said timing means effective to operate said relay in order to render said signal transmitting means operative a predetermined interval of time after the transmission of said off-hook signal.

7. In a telephone system, a connector for extending a connection to a called line and a station on said line, a magnet for operating said connector, a pulse source, a relay, means comprising said relay for connecting said pulse source to said magnet to cause the selective operation of said connector, means for seizing said connector, means responsive to the seizure of said connector for operating said relay, means operative after the operation of said magnet for causing said seizure responsive means to release said relay, means thereafter effective for rendering said pulse source connecting means inoperative, timing means for periodically generating signals, supervisory means operative in response to the transmission of an off-hook signal from said station to said connector for causing said relay to operate from a signal transmitted from said timing means a predetermined time interval after the operation of said supervisory means, a tone source, said relay being effective in resonse to the operation of said supervisory means for connecting said tone source to said connection.

8. In a telephone system, a connector for extending a connection to a called line and a station on said line, a magnet for operating said connector, a pulse source, a relay comprising sets of contacts, means comprising one of said contact sets operative in response to the operation of said relay for connecting said pulse source to said magnet to cause the selective operation of said connector, means for seizing said connector, means responsive to the seizure of said connector for operating said relay, means operative after the operation of said magnet for causing said seizure responsive means to release said relay, means thereafter effective for rendering said pulse source connecting means inoperative, timing means for periodically generating signals, supervisory means operative in response to the transmission of an off-hook signal from said station to said connector for causing said relay to operate from a signal transmitted from said timing means, a tone source, and means comprising another of said contact sets operative in response to the operation of said relay and the operation of said supervisory means for connecting said tone source to said connection.

9. In a telephone system, a connector for extending a connection from a calling line to a called line and a station on said called line, means comprising said calling line for seizing said connector, a first relay, means operative in response to the seizure of said connector for operating said first relay, means for operating said connector, means under the control of said calling line for energizing said operating means, means comprising said first relay for connecting said energizing means to said operating means, means operative after the operation of said connector operating means for rendering said energizing connecting means inoperative, a second relay, means comprising said second relay for detecting a busy condition on said called line to prevent the completion of said connection, means operative in the event said called line is in idle condition for rendering said busy condition detecting means inoperative, means for opening said connection within said connector, means comprising said second relay for preparing said opening means and said first relay for operation, means comprising said first relay for transmitting a signal to said connection, timing means for generating periodic signals, and supervisory means operative in response to the transmission of an off-hook signal from said called line station to said connector for making said second relay operate from a signal transmitted from said timing means to signal said connection and for thereafter making said opening means operative from another signal transmitted from said timing means.

10. In a telephone system, a connector for extending a connection to a called line and a station on said called line, a magnet for operating said connector, a pulse source, a first relay, means comprising said first relay for connecting said pulse source to said magnet to cause the selective operation of said connector, means for seizing said connector, means responsive to the seizure of said connector for operating said first relay, means operative after the operation of said magnet for causing said seizure responsive means to release said first relay, means thereafter effective for rendering said pulse source connecting means inoperative, a second relay, means comprising said second relay operative in response to a busy condition on said called line for connecting a busy tone source to said connector, timing means for periodically generating signals, means operative in response to an off-hook signal transmitted from said station to said connector for causing said second relay to operate from a signal transmitted from said timing means, means operative in response to the operation of said second relay for causing said first relay to operate from a signal transmitted from said timing means a first predetermined time interval after the operation of said supervisory means, means responsive to the operation of said first relay and said supervisory means for connecting a warning tone to said connection, means for opening said connection within said connector, and said second relay also being operative for causing said opening means to operate from another signal transmitted from said timing means a second predetermined time interval after the operation of said supervisory means.

References Cited in the file of this patent

UNITED STATES PATENTS

| | | |
|---|---|---|
| 1,829,799 | Hatton et al. | Nov. 3, 1931 |
| 2,595,062 | Elliott | Apr. 29, 1952 |
| 2,652,455 | Lomax | Sept. 15, 1953 |

U. S. DEPARTMENT OF COMMERCE

PATENT OFFICE

CERTIFICATE OF CORRECTION

Patent No. 2,824,171 February 18, 1958

Ernest H. Gatzert

It is hereby certified that error appears in the printed specification of the above numbered patent requiring correction and that the said Letters Patent should read as corrected below.

Column 7, line 72, for "interrupter 150" read -- interrupter I50 --; column 8, line 75, for "said one" read -- said tone --; column 10, line 11, for "resonse" read -- response --.

Signed and sealed this 15th day of April 1958.

(SEAL)
Attest:

KARL H. AXLINE
Attesting Officer

ROBERT C. WATSON
Commissioner of Patents